United States Patent
Shen et al.

(10) Patent No.: US 12,157,277 B2
(45) Date of Patent: Dec. 3, 2024

(54) VIBRATION WELDING FIBER-REINFORCED COMPOSITE AIRCRAFT STRUCTURES

(71) Applicant: Rohr, Inc., Chula Vista, CA (US)

(72) Inventors: Shyan Bob Shen, San Diego, CA (US); Michael van Tooren, San Diego, CA (US); Sarah Lohman, San Diego, CA (US); Daniel O. Ursenbach, Caledonia, IL (US); Paolo Ballocchi, Newcastle (GB)

(73) Assignee: ROHR, INC., Chula Vista, CA (US)

( * ) Notice: Subject to any disclaimer, the term of this patent is extended or adjusted under 35 U.S.C. 154(b) by 190 days.

(21) Appl. No.: 17/566,239

(22) Filed: Dec. 30, 2021

(65) Prior Publication Data
US 2023/0211562 A1 Jul. 6, 2023

(51) Int. Cl.
 B29C 65/06 (2006.01)
 B29C 65/00 (2006.01)
 B29L 31/30 (2006.01)

(52) U.S. Cl.
 CPC ........ B29C 65/0618 (2013.01); B29C 66/536 (2013.01); B29C 66/71 (2013.01); B29C 66/721 (2013.01); *B29L 2031/3076* (2013.01)

(58) Field of Classification Search
 CPC ... B29C 65/0618; B29C 66/71; B29C 66/721; B29C 66/7212; B29L 2031/3076
 USPC ....................................................... 156/73.5
 See application file for complete search history.

(56) References Cited

U.S. PATENT DOCUMENTS

| | | |
|---|---|---|
| 5,725,940 A | 3/1998 | Sakai |
| 8,603,279 B2 | 12/2013 | Malasse |
| 9,339,988 B2 | 5/2016 | Kato |
| 9,422,024 B2 | 8/2016 | Al-Sheyyab |
| 9,481,279 B2 | 11/2016 | Sano |
| 9,751,477 B2 | 9/2017 | Iwano |
| 10,889,076 B2 | 1/2021 | Yokomizo |
| 11,001,008 B2 | 5/2021 | Van Tooren |

(Continued)

FOREIGN PATENT DOCUMENTS

| | | |
|---|---|---|
| EP | 4209334 A1 | 7/2023 |
| JP | 2013014113 A | 1/2013 |

OTHER PUBLICATIONS

Forward Technology, "About Linear Vibration Welding", http://www.forwardtech.com/plastic-assembly/vibration-welders/about-linear-vibration-welding, Nov. 4, 2014.

(Continued)

*Primary Examiner* — James D Sells
(74) *Attorney, Agent, or Firm* — Getz Balich LLC (57) ABSTRACT

During a formation method, a first component and a second component are provided. The first component is configured from or otherwise includes a first fiber-reinforced thermoplastic composite. The first component also includes a base and a material buildup on a portion of the base. The second component is configured from or otherwise includes a second fiber-reinforced thermoplastic composite. The second component is arranged with the first component. The second component abuts the material buildup. The second component is vibration welded to the first component to provide a weld joint between the first component and the second component. At least a portion of the material buildup is displaced during the vibration welding.

14 Claims, 11 Drawing Sheets

(56) References Cited

U.S. PATENT DOCUMENTS

| | | | |
|---|---|---|---|
| 11,731,369 B2 * | 8/2023 | Shen ................ | B29C 65/0618 |
| | | | 428/36.4 |
| 2002/0136856 A1 | 9/2002 | Sugimura | |
| 2013/0309001 A1 | 11/2013 | Masatomo | |
| 2017/0157908 A1 | 6/2017 | Meer | |
| 2018/0009050 A1 | 1/2018 | Tokita | |
| 2022/0243844 A1 | 8/2022 | Sakai | |

OTHER PUBLICATIONS

EP search report for EP23150069.5 dated Sep. 4, 2023.
EP Office Action for EP Patent Application No. 23150069.5 dated Jul. 3, 2024.

* cited by examiner

VIBRATION WELDING FIBER-REINFORCED COMPOSITE AIRCRAFT STRUCTURES

BACKGROUND

1. Technical Field

This disclosure relates generally to forming fiber-reinforced thermoplastic structures and welding components thereof together.

2. Background Information

Thermoplastic materials are increasingly being used in various aerospace applications. Forming fiber-reinforced thermoplastic structures, however, may be time consuming and costly using known formation processes. For example, various welding techniques are being developed for welding fiber-reinforced thermoplastic aircraft structures. These welding techniques include resistance welding, induction welding, ultrasonic welding and laser welding. These welding techniques, however, may require a relatively high capital investment and relatively long welding times in minutes to tens of minutes to achieve each weld. There is a need in the art therefore for improved processes for forming fiber-reinforced thermoplastic structures which may decrease formation time, complexity and/or expense.

SUMMARY OF THE DISCLOSURE

According to an aspect of the present disclosure, a formation method is provided. During this formation method, a first component and a second component are provided. The first component is configured from or otherwise includes a first fiber-reinforced thermoplastic composite. The first component also include a base and a material buildup on a portion of the base. The second component is configured from or otherwise includes a second fiber-reinforced thermoplastic composite. The second component is arranged with the first component. The second component abuts the material buildup. The second component is vibration welded to the first component to provide a weld joint between the first component and the second component. At least a portion of the material buildup is displaced during the vibration welding.

According to another aspect of the present disclosure, another formation method is provided. During this formation method, a first component and a second component are provided. The first component is configured from or otherwise includes a first fiber-reinforced thermoplastic composite. The first component also includes a first surface and a second surface. At least a portion of the first surface has a curved sectional geometry. At least a portion of the second surface has a curved sectional geometry and is misaligned with the portion of the first surface. The second component is configured from or otherwise includes a second fiber-reinforced thermoplastic composite. The second component is vibration welded to the first component along the portion of the first surface and the portion of the second surface.

According to still another aspect of the present disclosure, another formation method is provided. During this formation method, a first preform is stamped into a first component configured from or otherwise including a first fiber-reinforced thermoplastic composite. The first fiber-reinforced thermoplastic composite includes at least thirty-five percent by unit volume continuous fibers. A second preform is stamped into a second component configured from or otherwise including a second fiber-reinforced thermoplastic composite. The second component is vibration welded to the first component. The first component and the second component are included in a structure for an aircraft.

At least one of the first component or the second component may have a material buildup prior to the vibration welding. At least a portion of the material buildup may be consumed by the vibration welding to provide a weld joint between the first component and the second component.

The portion of the first surface may be adjacent the portion of the second surface.

The providing of the first component may include stamp forming the first component from a first preform. In addition or alternatively, the providing of the second component may include stamp forming the second component from a second preform.

The material buildup may at least or only include one or more pure thermoplastic resin layers.

The material buildup may at least or only include one or more fiber-reinforced thermoplastic composite layers.

The portion of the material buildup may be displaced to at least one side of the weld joint during the vibration welding.

Prior to the vibration welding, a geometry of a perimeter of the material buildup may match a geometry of a perimeter of a portion of the second component that is vibration welded to the first component.

Prior to the vibration welding, a size of a perimeter of the material buildup may be equal to, or within fifteen percent of, a size of a perimeter of a portion of the second component that is vibration welded to the first component.

The base may have a base thickness prior to the vibration welding at a location where the second component is to be vibration welded to the first component. The first component may have a component thickness at the location following the vibration welding that is equal to, or within five or fifteen percent of, the base thickness.

The first fiber-reinforced thermoplastic composite may at least or only include fiber reinforcement embedded within thermoplastic material. The base may be at least or only formed from or otherwise include the fiber reinforcement and some of the thermoplastic material. The material buildup may be at least or only formed from or otherwise include some of the thermoplastic material.

The first fiber-reinforced thermoplastic composite may at least or only include fiber reinforcement embedded within thermoplastic material. The base may be at least or only formed from or otherwise include some of the fiber reinforcement and some of the thermoplastic material. The material buildup may be at least or only formed from or otherwise include some of the fiber reinforcement and some of the thermoplastic material.

The second component may include a second base and a second material buildup on a portion of the base. The material buildup may abut the second material buildup prior to the vibration welding. At least a portion of the second material buildup may be displaced during the vibration welding.

The first fiber-reinforced thermoplastic composite may include at least thirty-five percent by unit volume continuous fibers. In addition or alternatively, the second fiber-reinforced thermoplastic composite may include at least thirty-five percent by unit volume continuous fibers.

The vibration welding may also provide a second weld joint between the first component and the second component. The second weld joint may be angularly offset from the weld joint.

The weld joint may be disposed along a first curved surface of the first component. The second weld joint may be disposed along a second curved surface of the first component.

The vibration welding may also provide a second weld joint between the first component and the second component. The second weld joint may be spaced from the weld joint.

The providing of the first component may include stamping the first component from a first preform. In addition or alternatively, the providing of the second component may include stamping the second component from a second preform.

The first component and the second component may be included in a structure for an aircraft.

The first component and/or the second component may each include at least one of glass fibers, carbon fibers, aramid fibers, basalt fibers, mineral fibers, fibers from renewable raw materials, metal fibers or polymer fibers.

The first component and/or the second component may each include a thermoplastic material. The thermoplastic material may at least include polyimide (PA), polypropylene (PP), polyethylene (PE), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK).

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for vibration welding fiber-reinforced thermoplastic structures together. By contrast to other welding techniques such as resistance welding, induction welding, ultrasonic welding and/or laser welding, vibration welding may have a lower instrument cost and/or provide higher speed welding times; e.g., within seconds to tens of seconds. Vibration welding processes, however, are typically performed for pure thermoplastic parts or short-fiber reinforced thermoplastic composite parts, and not performed on continuous fiber-reinforced composite aircraft parts. One challenge to implementing vibration welding is that a welding surface may be consumed during the welding, which consumption may reduce a thickness of the composite laminate and/or reduce mechanical properties of the composite laminate. In some cases, the consumed interface layers may change a symmetry of the composite laminate and introduce asymmetric bending, which bending may further impact performance of the composite laminate. The methods of the present disclosure may address one or more of these challenges as described below in further detail.

Figure 1:
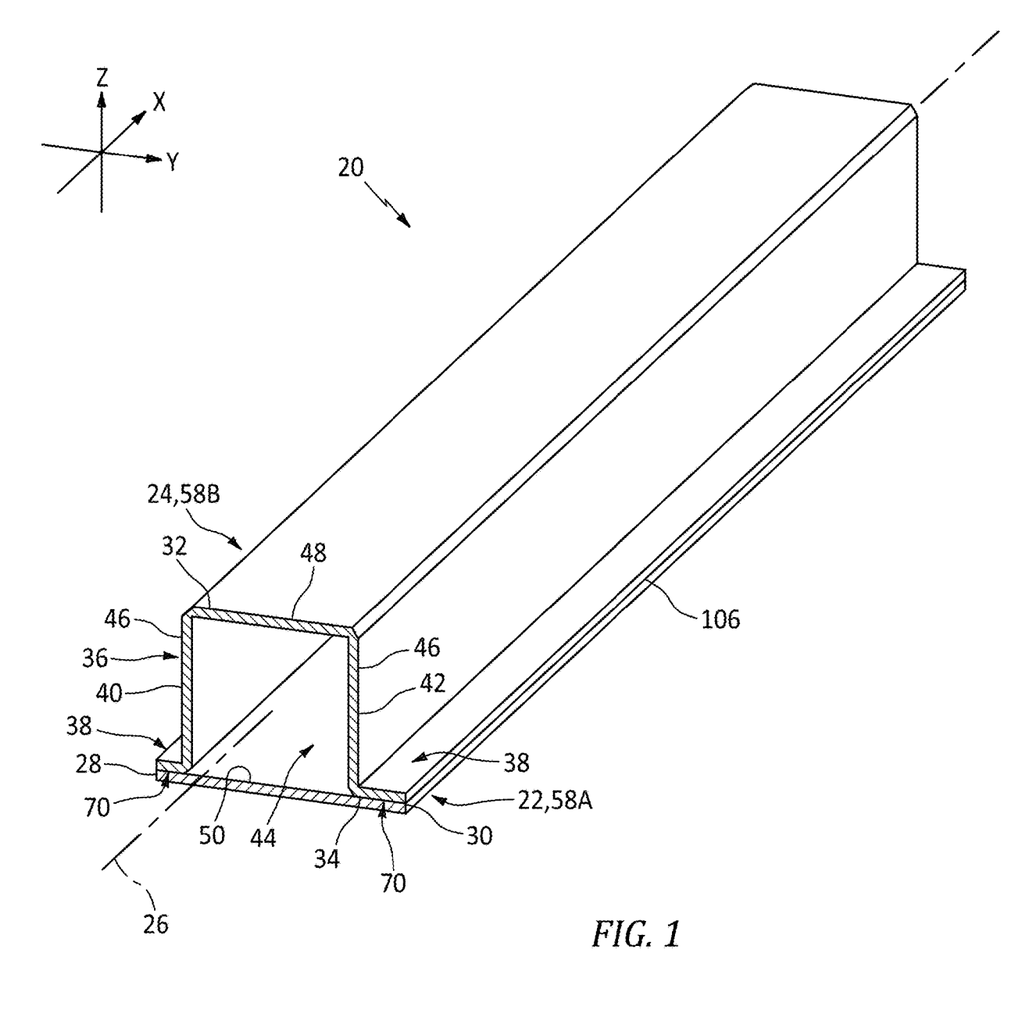
FIG. 1 is a perspective illustration of a portion of a fiber-reinforced thermoplastic structure.

FIG. 1 illustrates a portion of a fiber-reinforced thermoplastic structure 20 for an aircraft. This structure 20 may be arranged within a cabin of the aircraft. The structure 20, for example, may be configured as or may otherwise be part of an aircraft seat; e.g., a seat frame. The structure 20 may alternatively be configured as a part of a fuselage or a wing of the aircraft. The structure 20 may still alternatively be configured as a part of a propulsion system for the aircraft; e.g., a component of a nacelle, etc. The present disclosure, however, is not limited to the forgoing exemplary aircraft structures. Furthermore, it is contemplated the structure 20 of the present disclosure may also be configured for non-aircraft applications. However, for ease of description, the structure 20 may be referred to below as an aircraft structure.

The aircraft structure 20 of FIG. 1 includes a plurality of components including an exterior skin 22 and a support member 24; e.g., a stringer. The support member 24 extends longitudinally along a longitudinal centerline 26 of the support member 24; e.g., along an x-axis. The support member 24 extends laterally (e.g., along a y-axis) between and to a first side 28 of the support member 24 and a second side 30 of the support member 24. The support member 24 extends vertically (e.g., along a z-axis) between and to an exterior side 32 of the support member 24 and an interior side 34 of the support member 24.

The support member 24 of FIG. 1 includes a channeled base 36 and one or more mounts 38; e.g., flanges. The channeled base 36 extends longitudinally along the longitudinal centerline 26. The channeled base 36 extends laterally between and to a first side 40 of the channeled base 36 and a second side 42 of the channeled base 36. The channeled base 36 extends vertically between and to (or about)

the support interior side 34 and the support exterior side 32. The channeled base 36 is configured with a U-shaped cross-sectional geometry when viewed, for example, in a reference plane perpendicular to the longitudinal centerline 26. This configuration provides the channeled base 36 with a channel 44 that extends longitudinally in (e.g., through) the support member 24 and its channeled base 36. The channel 44 extends laterally in (e.g., within) the support member 24 and its channeled base 36 between opposing sidewalls 46 of the channeled base 36. The channel 44 projects vertically into the support member 24 and its channeled base 36 from the support interior side 34 to an endwall 48 of the channeled base 36.

Each of the mounts 38 is connected to (e.g., formed integral with) the channeled base 36. Each of the mounts 38 is disposed at (e.g., on, adjacent or proximate) the support interior side 34. Each of the mounts 38 projects laterally out from a respective one of the base sidewalls 46 to a distal end of that mount 38. Each of these mounts 38 is vibration welded to the exterior skin 22 at/along an interior surface 50 of the exterior skin 22.

Figure 2A:
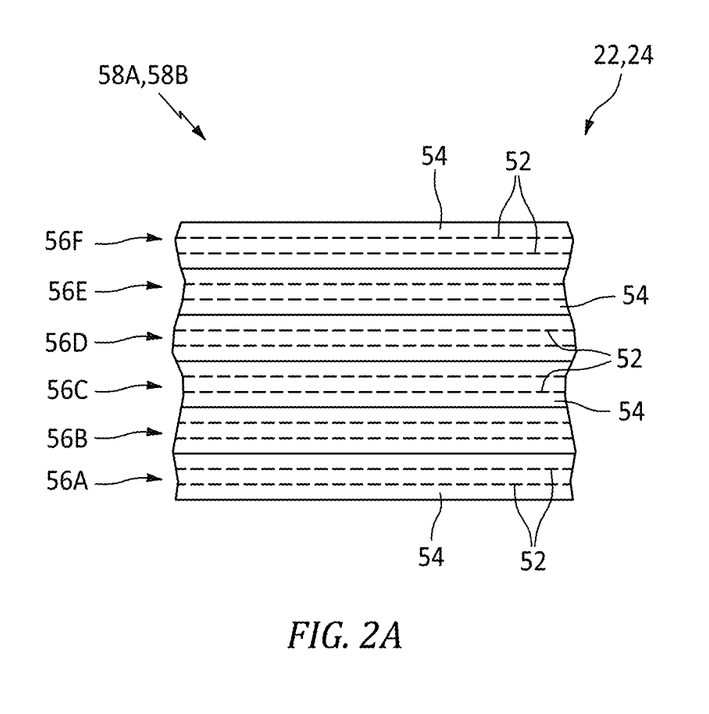
FIGS. 2A and 2B are partial sectional illustrations of structure components with various multi-layer configurations.
Figure 2B:
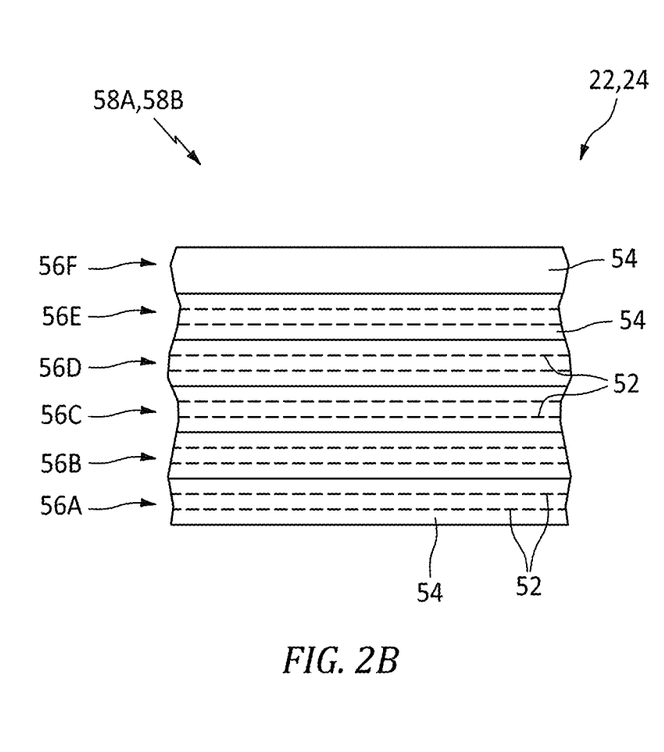

Referring to FIGS. 2A and 2B, each of the aircraft structure components 22, 24 is constructed from a common (e.g., the same) or a unique component material. The component material may be a fiber-reinforced thermoplastic composite. Fiber-reinforcement 52, for example, may be embedded within a thermoplastic material 54; e.g., a thermoplastic matrix. Examples of the fiber-reinforcement 52 include, but are not limited to, metal fibers (e.g., aluminum fibers, brass fibers, and stainless steel fibers), carbon fibers (including graphite fibers such as polyacrylonitrile (PAN)-based carbon fibers, rayon-based carbon fibers, lignin-based carbon fibers, and pitch-based carbon fibers (insulating fibers (e.g., glass fibers), organic fibers (e.g., aramid fibers, polyparaphenylene benzoxazole (PBO) fibers, polyphenylene sulfide fibers, polyester fibers, acrylic fibers, nylon fibers, and polyethylene fibers), and inorganic fibers (e.g., silicon carbide fibers and silicon nitride fibers). Some or all of these fibers may be continuous fibers. Some or all of the fibers may also or alternatively be chopped fibers.

Examples of the thermoplastic material 54 include, but are not limited to, a semi-crystalline thermoplastic resin and an amorphous thermoplastic resin. Examples of the semi-crystalline thermoplastic resin include, but are not limited to, polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include, but are not limited to, polyethylene terephthalate (PET), polybutylene terephthalate (PBT), polytrimethylene terphthalate (PTT), polyethylene naphthalate (PEN), and liquid crystal polyester. Examples of the polyolefin include, but are not limited to, polyethylene (PE), polypropylene (PP), and polybutylene. An example of the polyarylene sulfide includes, but is not limited to, polyphenylene sulfide (PPS). An example of the fluororesin includes, but is not limited to, polytetrafluoroethylene. Examples of the amorphous thermoplastic resin include, but are not limited to, polystyrene, polycarbonate (PC), polymethyl methacrylate (PMMA), polyvinyl chloride (PVC), polyphenylene ether (PPE), polyimide (PI), polyamide imide (PAI), polyetherimide (PEI), polysulfone (PSU), polyether sulfone (PES), and polyarylate (PAR). The thermoplastic material 54 to be used for the control surface may also be phenoxy resin, polystyrene, polyolefin, polyurethane, polyester, polyamide, polybutadiene, polyisoprene, fluorine resin, acrylonitrile, or other thermoplastic elastomers, or copolymers and/or modified resin thereof.

Each of the aircraft structure components 22, 24 may be constructed from one or more layers 56A-F (generally referred to as "56"). Each of these component layers 56 of FIG. 2A may include the fiber-reinforcement 52 within the thermoplastic material 54. Within each component layer 56, the fiber-reinforcement fibers may be unidirectional. The fiber-reinforcement fibers may alternatively be multi-directional (e.g., in a woven sheet, a mat of chopped fibers, etc.) in one or more of the component layers 56. In some embodiments however, referring to FIG. 2B, one or more of the component layers 56 (e.g., 56F) may alternatively be configured without any fiber-reinforcement fabrics; e.g., the respective outer component layer 56F may substantially or only include the thermoplastic material 54.

Referring to FIGS. 2A and 2B, one or more of the aircraft structure components 22 and 24 may each include between thirty-five percent (35%) and ninety-five percent (95%) of the fiber-reinforcement 52 (e.g., fibers) per unit of volume and between five percent (5%) and sixty-five percent (65%) of the thermoplastic material 54 per unit of volume. For example, each aircraft structure components 22, 24 may include at least forty percent (40%), forty-five percent (45%), fifty percent (50%), fifty-five percent (55%) or more of the fiber-reinforcement 52 (e.g., fibers) per unit of volume. Such a relatively high volume fraction of the fiber-reinforcement 52 (e.g., fibers) may increase a structural strength and/or a stress tolerance of the respective aircraft structure component. Similarly, one or more or all of the component layers 56 in a respective one of the aircraft structure components 22, 24 may each include the foregoing (or different) percentages of fiber-reinforcement 52 (e.g., fibers) per unit of volume and the thermoplastic material 54 per unit of volume. The present disclosure, however, is not limited to the foregoing exemplary relationships between the fiber-reinforcement 52 and the thermoplastic material 54. One or more of the component layers 56 in a respective one of the aircraft structure components 22, 24, for example, may include less than thirty-five percent (35%) of the fiber-reinforcement 52 (e.g., fibers) per unit of volume. For example, referring to FIG. 2B, the component layer(s) 56 (e.g., 56F) that substantially or only include the thermoplastic material 54 may include up to zero percent of the fiber-reinforcement 52 (e.g., fibers) per unit of volume. Such a component layer (or layers) may be used for/in a material buildup (e.g., see 82 in FIG. 7A) as described below in further detail.

Figure 3:
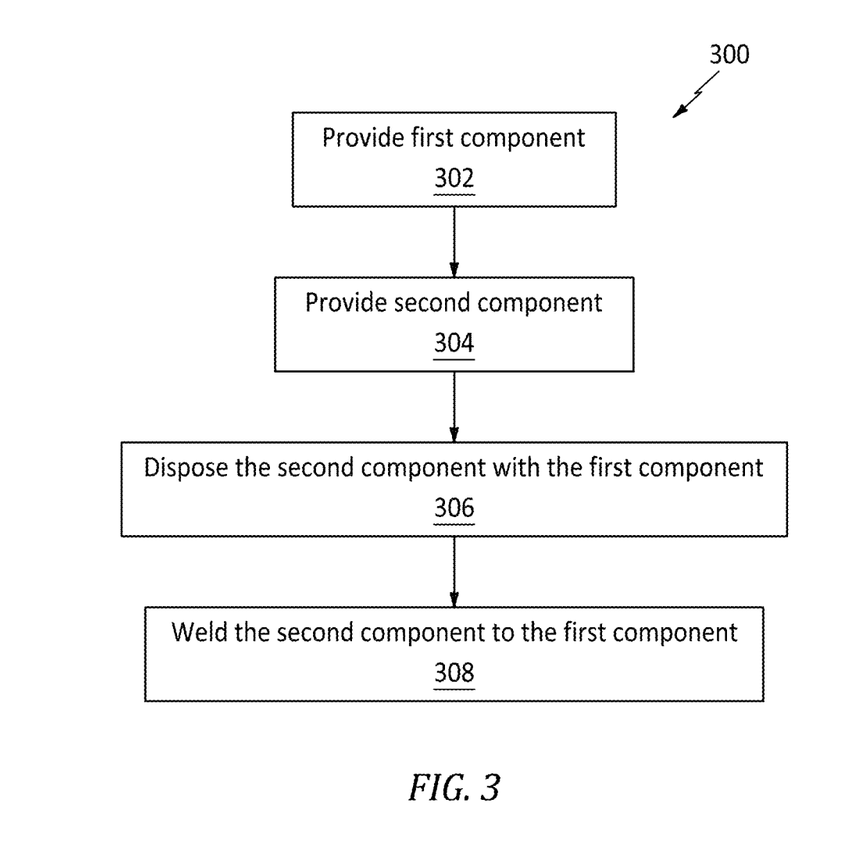
FIG. 3 is a flow diagram of a method for forming the structure.

FIG. 3 is a flow diagram of a method 300 for forming a fiber-reinforced thermoplastic structure. For ease of description, the method 300 may be described below with reference to the aircraft structure 20 described herein. The method 300 of the present disclosure, however, is not limited to forming any particular types or configurations of aircraft structures nor fiber-reinforced thermoplastic structures in general.

In step 302, a first component 58A such as the exterior skin 22 is provided. The first component 58A of FIG. 1 may be formed using one or more formation processes. Examples of these formation processes include, but are not limited to, laminating, molding, pressing, injection molding, and overmolding. Where the first component 58A has a three-dimensional geometry, the first component 58A may also or alternatively be formed by stamping between a plurality of dies. The present disclosure, however, is not limited to the foregoing exemplary first component formation techniques.

Figure 4A:
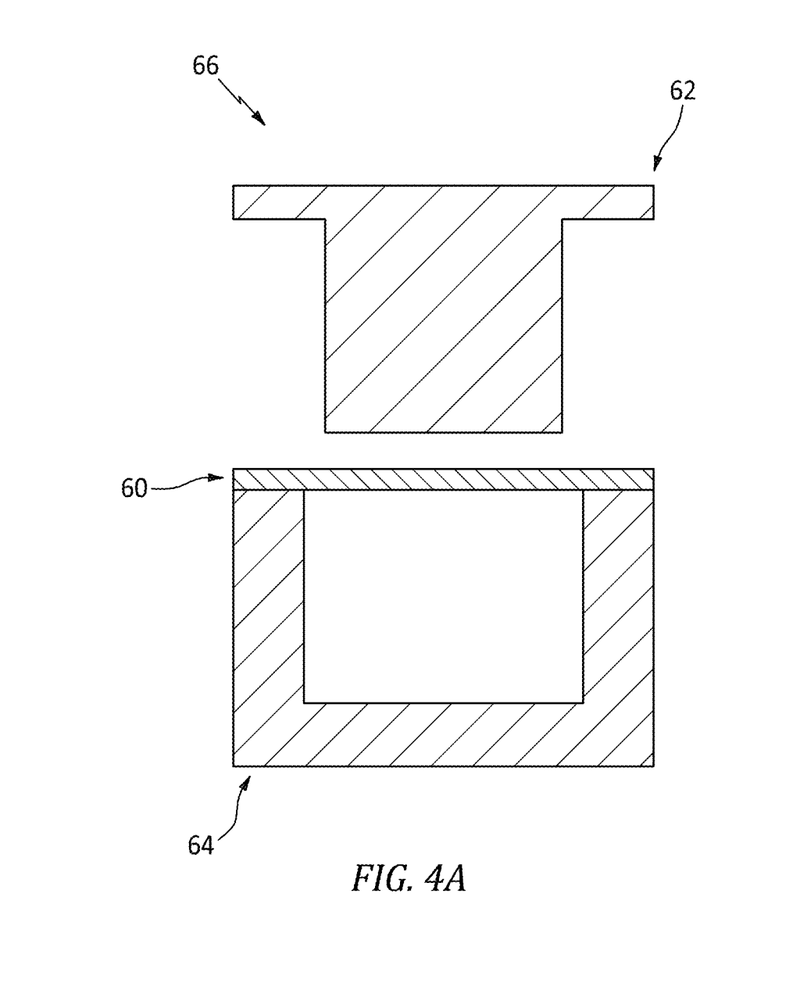
FIGS. 4A and 4B are sectional schematic illustrations depicting stamping of a structure component.
Figure 4B:
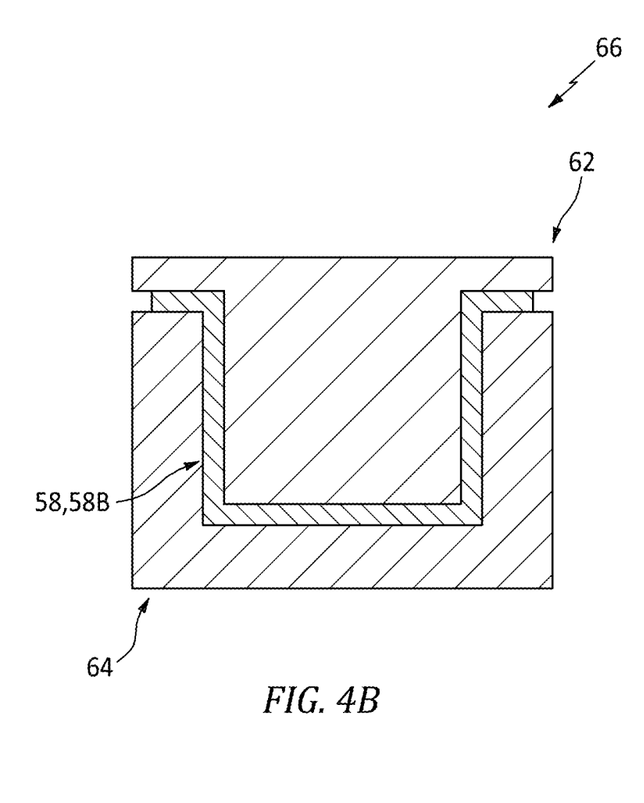

In step 304, a second component 58B such as the support member 24 is provided. The second component 58B of FIG. 1 may be formed using one or more formation processes. Examples of these formation processes include, but are not limited to, laminating, molding, pressing, injection molding, overmolding, and stamping between a plurality of dies. For example, referring to FIG. 4A, a fiber-reinforced thermoplastic preform 60 (e.g., a sheet, plate, etc. of the fiber-reinforced thermoplastic) may be arranged between a top die 62 and a bottom die 64 of a die assembly 66. One or more of these dies 62 and 64 may be moved (e.g., vertically) from a first (e.g., open) arrangement of FIG. 4A to a second (e.g., closed) arrangement of FIG. 4B to stamp the preform 60 into the second component 58B. One or more of the dies 62 and 64 may subsequently by moved (e.g., vertically) back from the second arrangement of FIG. 4B to the first arrangement of FIG. 4A to facilitate release of the now stamped second component 58B from the die assembly 66. Such a stamping process may also or alternatively be performed to form the first component 58A or another component of the fiber-reinforced thermoplastic structure. The present disclosure, however, is not limited to the foregoing exemplary second component formation techniques.

Figure 5:
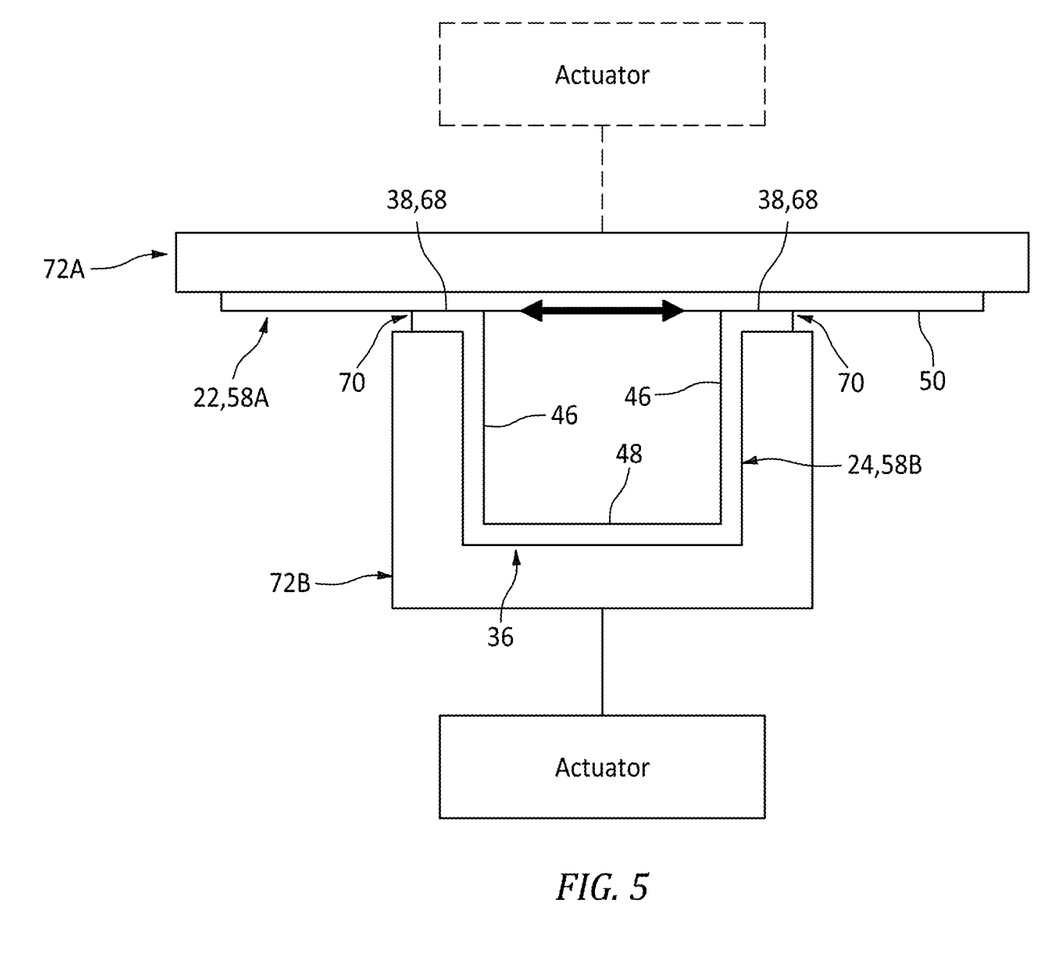
FIG. 5 is a schematic illustration of tooling for vibration welding structural components together.

In step 306, the second component 58B is disposed with the first component 58A. The support member 24 of FIG. 5, for example, may be arranged next to the exterior skin 22. One or more of the mounts 38 may (e.g., longitudinally and/or laterally) overlap and engage (e.g., abut against, contact, etc.) the interior surface 50 of the exterior skin 22. An interior surface 68 of each of the mounts 38, for example, may be laid flush against the interior surface 50 of the exterior skin 22.

In step 308, the second component 58B is vibration welded to the first component 58A. One or more of the mounts 38, for example, may each be linear vibration welded to the exterior skin 22 to provide a respective weld joint 70 (see also FIG. 6B) between the respective mount 38 and the exterior skin 22. For example, referring to FIG. 5, the first component 58A (e.g., the exterior skin 22) is arranged with first tooling 72A (e.g., a fixture), which first tooling 72A locates and/or holds the first component 58A for the vibration welding. The second component 58B (e.g., the support member 24) is arranged with second tooling 72B (e.g., a fixture), which second tooling 72B locates and/or holds the second component 58B for the vibration welding. During the vibration welding, the first tooling 72A and/or the second tooling 72B is moved (e.g., laterally and/or longitudinally; horizontally in FIG. 5) to generate heat (via frictional rubbing) at each interface between the first component 58A and the second component 58B. This heat locally melts the thermoplastic material 54 at the respective interface. The tooling 72A, 72B (generally referred to as "72") movement is subsequently terminated. The tooling 72 may hold the first component 58A and the second component 58B in position until the thermoplastic material 54 at each interface cools under pressure, resolidifying and thereby providing the respective weld joint 70. The now welded components 58A and 58B (generally referred to as "58") are subsequently released from the tooling 72, for example, for further processing; e.g., machining, finishing, etc.

Figure 6A:
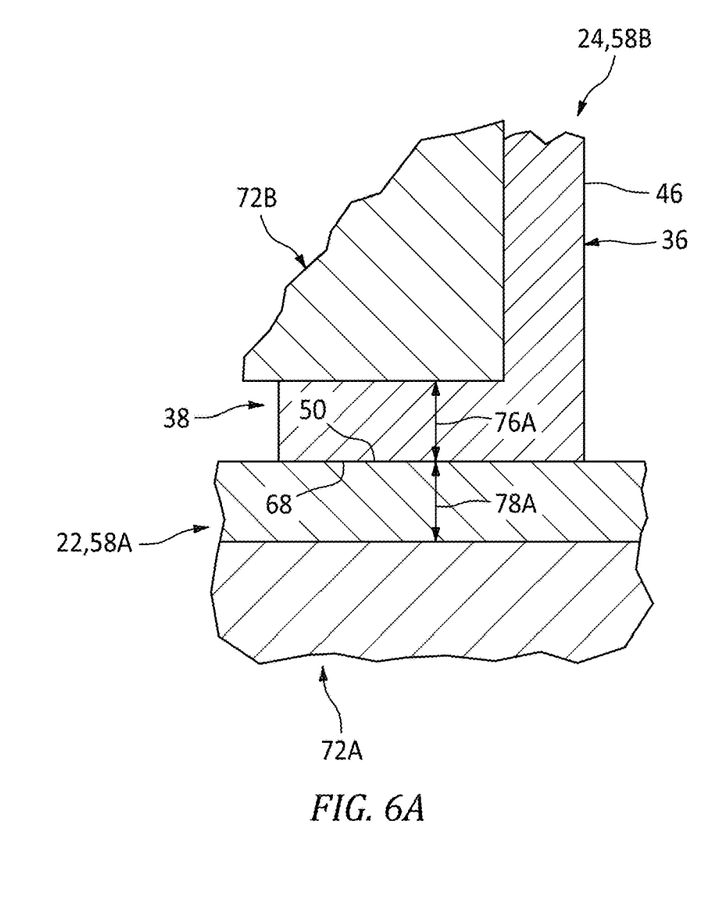
FIGS. 6A and 6B are partial sectional illustrations of an interface between the structure components before and after the vibration welding, where the structure components are configured without material buildups.
Figure 6B:
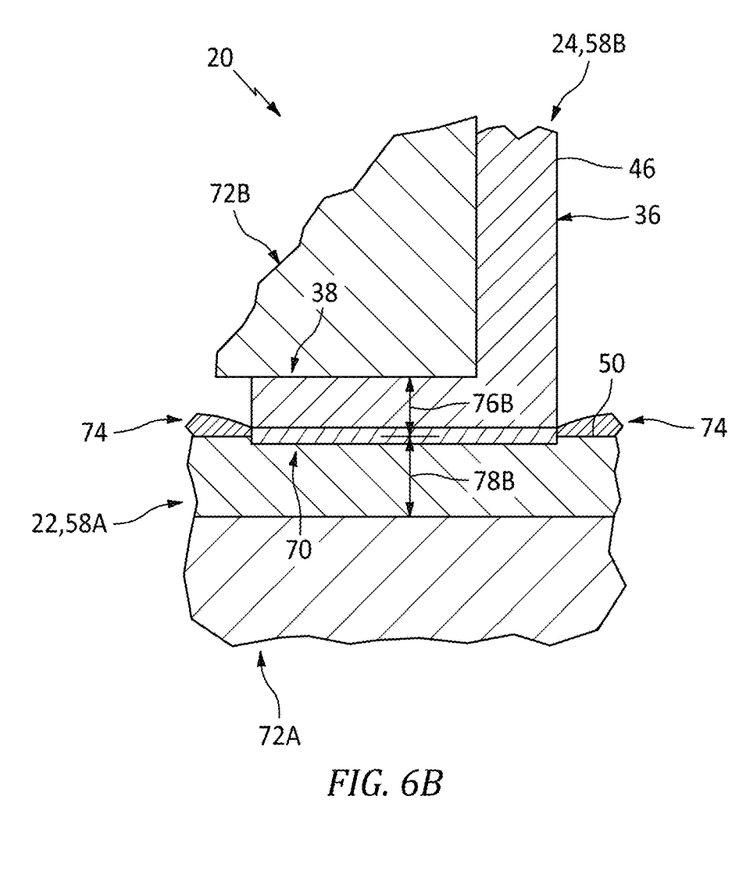

Referring to FIGS. 6A and 6B, interfacing portions of the fiber-reinforced thermoplastic composite of the first component 58A and the second component 58B may be consumed during the vibration welding step 308. In other words, the interfacing portions of the fiber-reinforced thermoplastic composite of the first component 58A and the second component 58B may (e.g., slightly) collapse during the vibration welding step 308. The term "collapse" may describe a distance one (e.g., a vibrating) part moves into another (e.g., a stationary) part during vibration welding. These material portions 74 (see FIG. 6B), for example, may be (e.g., laterally and/or longitudinally) displaced to one or more sides of the weld joint 70; e.g., to one or more sides of a respective mount 38. This consumption/displacement of the fiber-reinforced thermoplastic composite (e.g., see 74 in FIG. 6B) may decrease a thickness of each component 58A, 58B at the weld joint 70. The mount 38 of FIG. 6A, for example, has a vertical first mount thickness 76A at (e.g., on, adjacent or proximate) a location of the to-be-formed weld joint 70 prior to the vibration welding. The mount 38 of FIG. 6B, by contrast, may have a vertical second mount thickness 76B at the weld joint location that is different (e.g., less) than the first mount thickness 76A subsequent to the vibration welding. Thus, a portion of the first component 58A at the weld joint 70 may be consumed/collapse during the vibration welding step 308. Similarly, the exterior skin 22 of FIG. 6A has a vertical first skin thickness 78A at the weld joint location prior to the vibration welding. The exterior skin 22 of FIG. 6B, by contrast, may have a vertical second skin thickness 78B at the weld joint location that is also or alternatively different (e.g., less) than the first skin thickness 78A subsequent to the vibration welding. Thus, a portion of the second component 58B at the weld joint 70 may be consumed/collapse during the vibration welding step 308. Such a diminution in component thickness(es) may adversely affect structural properties of the aircraft structure 20 if not accounted as well as lead to unwanted bending of the aircraft structure 20.

The diminution in component thickness(es) may be accounted for by increasing an overall thickness of each component 58 to be vibration welded. Such an overall increase in component thickness, however, also increases cost, size and weight of the respective component 58 as well as the aircraft structure 20 in general. Alternatively, a thickness of one or more or all of the components 58 to be vibration welded together may be locally increased. For example, referring to FIG. 7A, the first component 58A (e.g., the exterior skin 22) may include a base 80 and one or more material buildups 82 (one visible in FIG. 7A) prior to the vibration welding. Each material buildup 82 is extra material that is added to the design of the aircraft structure 20; e.g., the laminate. For example, where too much of an outer layer of one of the components 58 may be sacrificed during the vibration welding leading to a relatively large collapse as discussed above, the material buildup 82 is provided. That material buildup 82 may be a ply (or multiple plies) of the laminate with fiber reinforcement (e.g., continuous and/or unidirectional fibers) in the same direction as the outer layer of the base 80. This extra material is included to provide symmetry and/or satisfy other design requirements following the vibration welding. The material buildup 82, for example, is included as a consumable for the vibration welding such that, for example, dimensions of the final aircraft structure 20 remains substantially constant along the weld. By contrast, the consumption of material shown in FIG. 6B may lead to unwanted bending of the aircraft structure 20, particular where the aircraft structure 20 and its components 58 are formed from a continuous fiber-reinforced composite. Note, the aircraft structure 20 may be less prone to such bending where the aircraft structure 20 and its components 58 are formed from a chopped fiber-reinforced composite or a pure thermoplastic material (e.g., without fiber reinforcement).

Figure 7A:
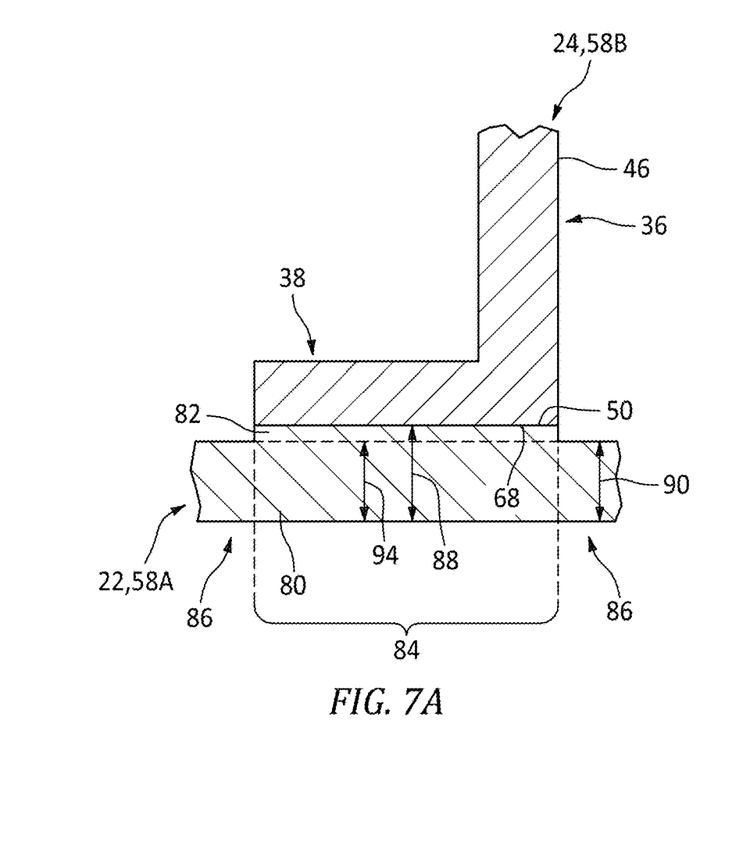
FIGS. 7A and 7B are partial sectional illustrations of an interface between the structure components before and after the vibration welding, where a first of the structure components is configured with a material buildup.
Figure 7B:
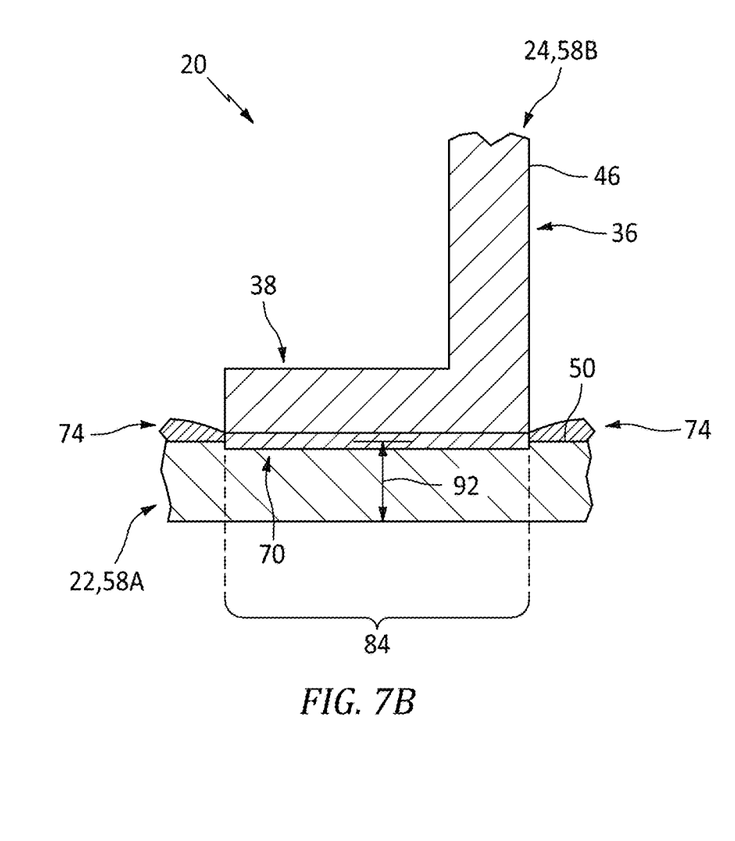
Figure 8:
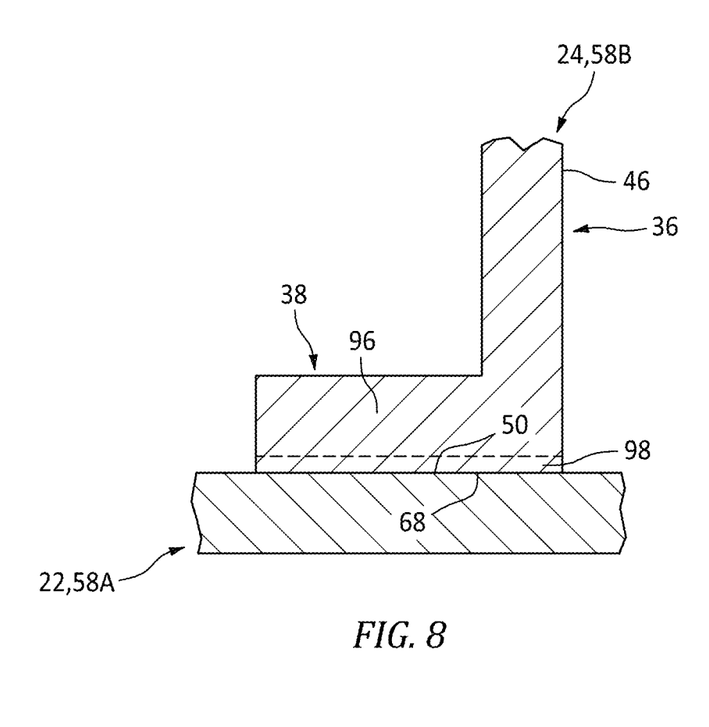
FIG. 8 is a partial sectional illustration of an interface between the structure components before the vibration welding, where a second of the structure components is configured with a material buildup.
Figure 9:
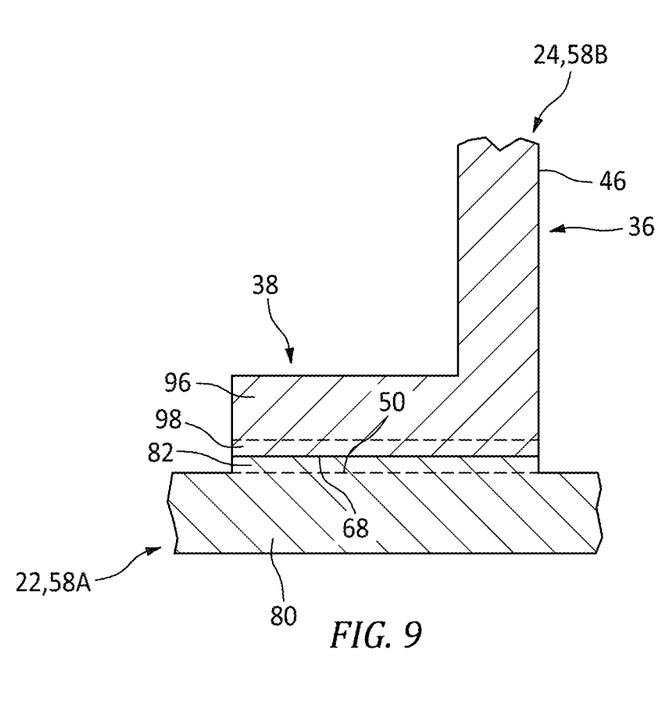
FIG. 9 is a partial sectional illustration of an interface between the structure components before the vibration welding, where each of the structure components is configured with a material buildup.

The base 80 may be constructed from the one or more component layers 56 (see FIG. 2A) of fiber reinforcement embedded within the thermoplastic material 54; e.g., thermoplastic matrix. The material buildup 82 may be a localized buildup of the thermoplastic material 54 (or a shortened layer of the fiber reinforcement embedded within the thermoplastic material 54) on a select portion of the base 80; e.g., see layer 56F in FIGS. 2A and 2B. More particularly, a (e.g., longitudinal and/or lateral) section 84 of the first component 58A at a respective weld location includes a respective (e.g., longitudinal and/or lateral) section of the base 80 and the respective material buildup 82. One or more sections 86 of the first component 58A (e.g., longitudinally and/or laterally) adjacent the built up section 84, however, may each include (e.g., only) a respective (e.g., longitudinal and/or lateral) section of the base 80 without the material buildup 82. A vertical thickness 88 of the built up section 84 may thereby be greater than a vertical thickness 90 of the adjacent nominal (e.g., non-built up) section(s) 86. Referring to FIGS. 7A and 7B, the amount of material locally built up on the base 80 in the built up section 84 may be selected such that the material buildup 82 is partially or completely consumed (e.g., displaced) during the vibration welding. More particularly, the amount of material locally built up on the base 80 in the built up section 84 of FIG. 7A may be selected such that a vertical thickness 92 of the first component 58A at the respective weld location subsequent to the vibration welding (see FIG. 7B) is exactly equal to or substantially equal to (e.g., within 1%, 2%, 5%, 10% of) a vertical thickness 94 of the base 80 at or about the respective weld location prior to the vibration welding (see FIG. 7A), where the thickness 94 may be equal to (or different than) the thickness 90. In other words, the respective material buildup 82 of FIG. 7A may be provided to maintain the dimensions of the first component 58A of FIG. 7B even through/across the weld joint 70. Similarly, referring to FIGS. 8 and 9, the second component 58B may also or alternatively be provided with a base 96 and one or more material buildups 98 (one visible in FIGS. 8 and 9) prior to the vibration welding to be at least partially or completely consumed (e.g., displaced) during the vibration welding.

Figure 10:
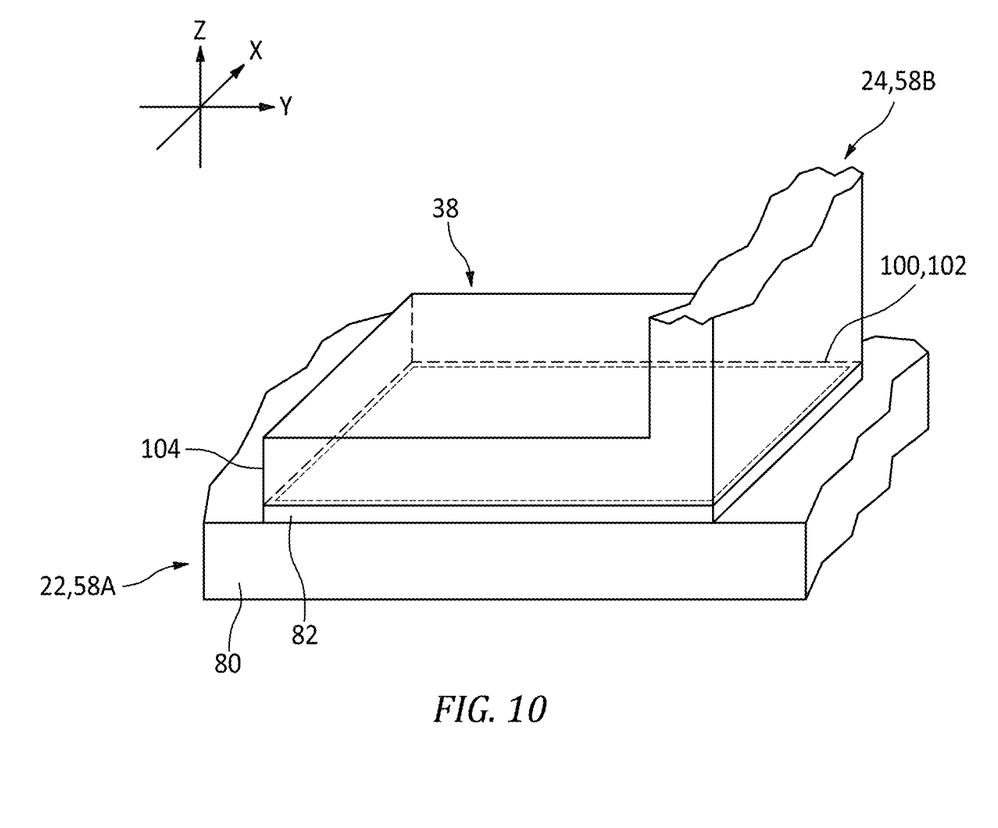
FIG. 10 is a partial perspective illustration of an interface between the structure components before the vibration welding.

In some embodiments, referring to FIG. 10, a geometry of a perimeter 100 of a respective material buildup 82 may match (e.g., be the same as) a geometry of a perimeter 102 of a portion 104 of another component (e.g., 24, 58B) to be vibration welded to the material buildup area. The perimeter 100 of the material buildup 82 and the perimeter 102 of the portion 104 of FIG. 10, for example, each have a polygonal (e.g., rectangular, square, triangular, etc.) perimeter geometry. The perimeters 100 and 102, of course, may have various other geometries.

In some embodiments, a size of a respective material buildup 82 may be exactly equal to or approximately equal to (e.g., within 5%, 10%, 15%, 20%, 25% of) a size of a geometry of the portion 104 of other component (e.g., 24, 58B) to be vibration welded to the material buildup area. Dimensions of the perimeter 100 of the material buildup 82 and dimensions of the perimeter 102 of the portion 102 of FIG. 10, for example, may be exactly or approximately equal. The perimeters 100 and 102, of course, may alternatively have different dimensions in other embodiments.

The structure 20 and its components 58 may have various configurations other than that described above. Examples of such alternative structure and component configurations are illustrated in FIGS. 11-14. The present disclosure, however, is not limited to such exemplary component configurations nor to such exemplary structure configurations.

Figures 11, 12:
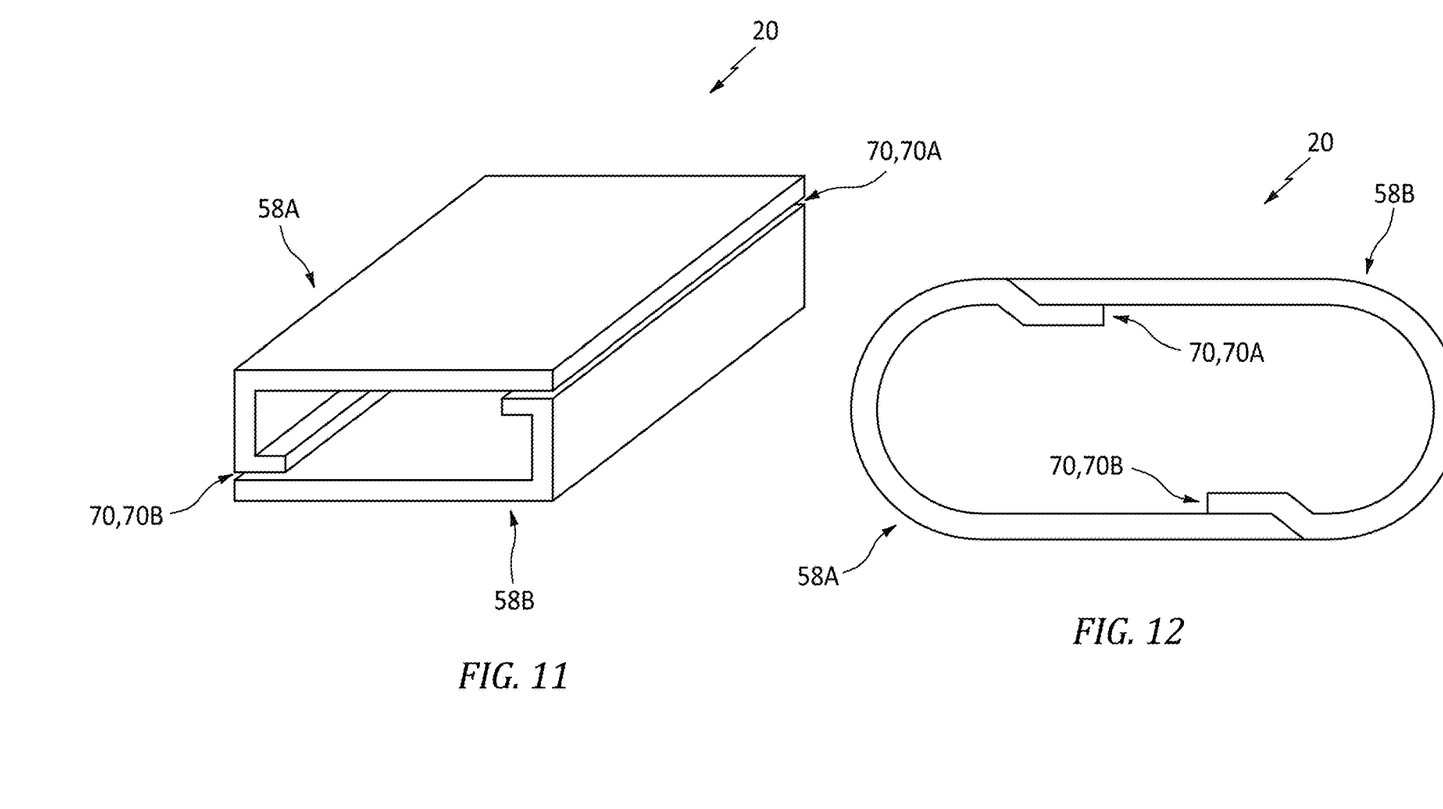
FIG. 11 is a partial perspective illustration of the structure with alternative component configurations.
FIG. 12 is a sectional illustration of the structure with alternative component configurations.

In some embodiments, referring to FIG. 1, each of the weld joints 70 may be arranged along/lay within a common plane; e.g., the x-y plane. In other embodiments, referring to FIGS. 11-14, two or more of the weld joints 70 may be arranged along/lay within different planes. The first weld joint 70A of FIGS. 11-13, for example, is arranged along/lays within a first plane and the second weld joint 70B is arranged along/lays within a second plane. The second weld joint 70B and its second plane of FIGS. 11-13 may be parallel with the first weld joint 70A and its first plane, but vertically offset (e.g., spaced) from the first weld joint 70A and its first plane by a vertical gap. The second weld joint 70B of FIGS. 11 and 12 is also laterally offset (e.g., spaced) from the first weld joint 70A by a vertical gap; or course, the second weld joint 70B may also or alternatively be longitudinally offset from the first weld joint 70A. By contrast, the second weld joint 70B of FIG. 13, is laterally aligned with (e.g., laterally overlaps, centered with respect to, etc.) the first weld joint 70A.

Figure 13:
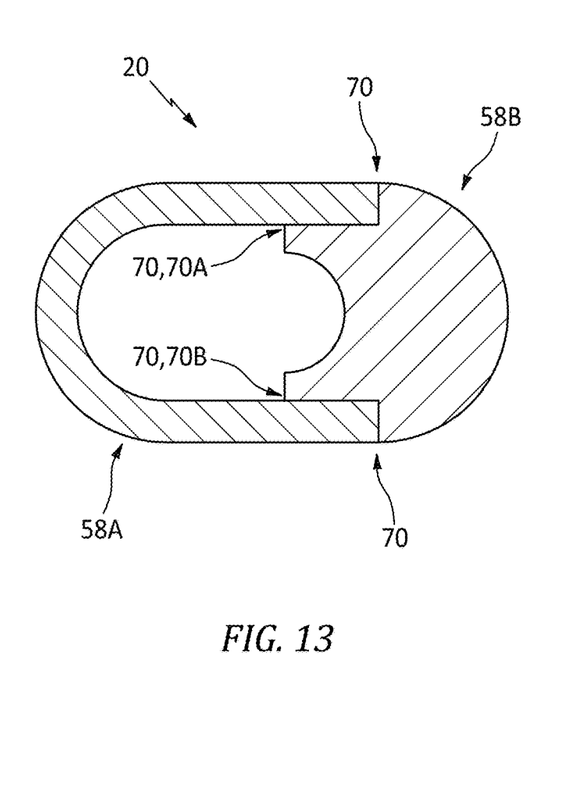
FIG. 13 is a sectional illustration of the structure with alternative component configurations.
Figure 14:
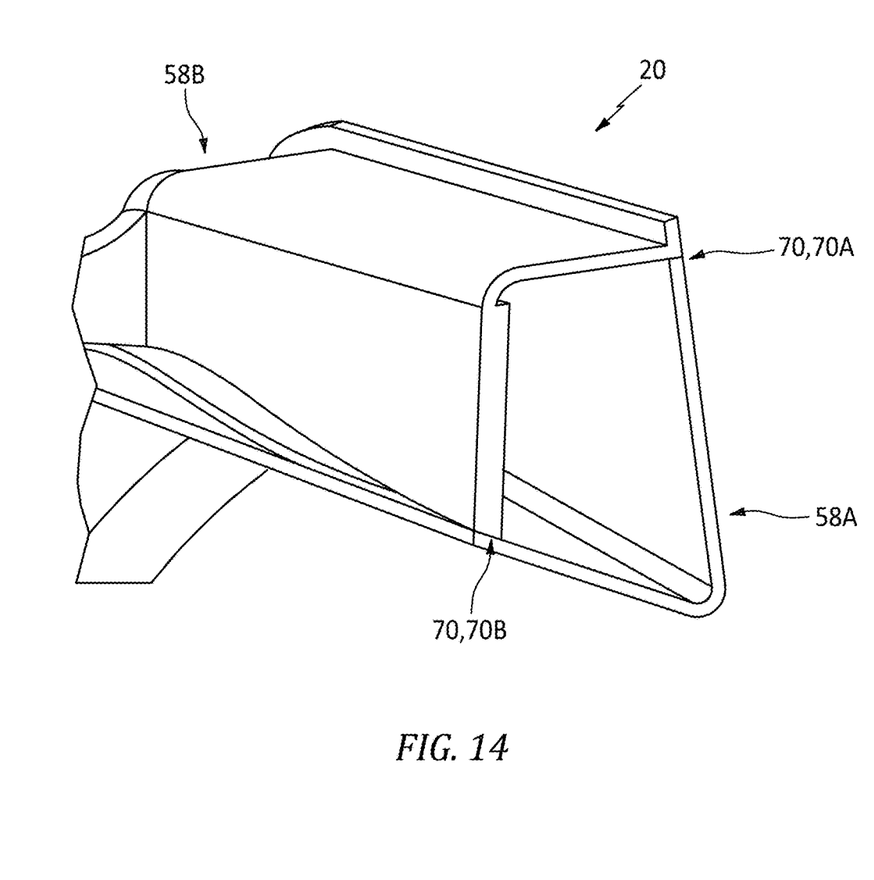
FIG. 14 is a partial perspective illustration of the structure with alternative component configurations.

In some embodiments, referring to FIGS. 1, the plane of at least one of the weld joints 70 may be parallel with the plane of at least another one of the weld joints 70; see also FIGS. 11-13. In other embodiments, referring to FIG. 14, the plane of at least one of the weld joints 70 may be angularly offset from the plane of at least another one of the weld joints 70. The first weld joint 70A and its first plane of FIG. 14, for example, is angularly offset from the second weld joint 70B and its second plane by an included angle, which included angle may be an acute angle, a right angle or an obtuse angle.

In some embodiments, referring to FIG. 1, one or more or each of the weld joints 70 may extend longitudinally along a straight centerline 106. The weld joints 70 of FIG. 1, for example, are formed along flat, planar surfaces (e.g., 50 and 68 in FIG. 6A) of the components 58. In other embodiments, referring to FIG. 14, one or more or each of the weld joints 70 (e.g., 70A and 70B) may each extend longitudinally along a curved centerline. The weld joints 70A and 70B of FIG. 14, for example, are arranged along respective component surfaces, where at least a portion or an entirety of each component surface has a curved (e.g., partially circular, arcuate, splined, etc.) sectional geometry.

In some embodiments, referring to FIGS. 11 and 12, the welded components 58 may have a common (e.g., the same, mirrored, etc.) configuration. In other embodiments, referring to FIGS. 1 and 14, the welded components 58 may have unique (e.g., different) configurations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:
1. A formation method, comprising:
   providing a first component comprising a first fiber-reinforced thermoplastic composite, the first component including a base and a material buildup on a portion of the base;
   providing a second component comprising a second fiber-reinforced thermoplastic composite;

arranging the second component with the first component, the second component abutting the material buildup; and vibration welding the second component to the first component to provide a weld joint between the first component and the second component, wherein at least a portion of the material buildup is displaced during the vibration welding, wherein:

the first fiber-reinforced thermoplastic composite comprises at least thirty-five percent by unit volume continuous fibers, and/or the second fiber-reinforced thermoplastic composite comprises at least thirty-five percent by unit volume continuous fibers.

2. The formation method of claim 1, wherein the material buildup consists of one or more pure thermoplastic resin layers.

3. The formation method of claim 1, wherein the material buildup comprises one or more fiber-reinforced thermoplastic composite layers.

4. The formation method of claim 1, wherein, prior to the vibration welding, a geometry of a perimeter of the material buildup matches a geometry of a perimeter of a portion of the second component that is vibration welded to the first component.

5. The formation method of claim 1, wherein, prior to the vibration welding, a size of a perimeter of the material buildup is equal to, or within fifteen percent of, a size of a perimeter of a portion of the second component that is vibration welded to the first component.

6. The formation method of claim 1, wherein
the base has a base thickness prior to the vibration welding at a location where the second component is to be vibration welded to the first component; and
the first component has a component thickness at the location following the vibration welding that is equal to, or within fifteen percent of, the base thickness.

7. The formation method of claim 1, wherein at least one of the first component or the second component comprises at least one of glass fibers, carbon fibers, aramid fibers, basalt fibers, mineral fibers, fibers from renewable raw materials, metal fibers or polymer fibers.

8. The formation method of claim 1, wherein at least one of the first component or the second component comprises a thermoplastic material comprising at least one of polyimide (PA), polypropylene (PP), polyethylene (PE), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK).

9. The formation method of claim 1, wherein
the second component includes a second base and a second material buildup on a portion of the base;
the material buildup abuts the second material buildup prior to the vibration welding; and
at least a portion of the second material buildup is displaced during the vibration welding.

10. The formation method of claim 1, wherein
the vibration welding further provides a second weld joint between the first component and the second component; and
the second weld joint is angularly offset from the weld joint.

11. The formation method of claim 10, wherein
the weld joint is disposed along a first curved surface of the first component; and
the second weld joint is disposed along a second curved surface of the first component.

12. The formation method of claim 1, wherein
the vibration welding further provides a second weld joint between the first component and the second component; and
the second weld joint is spaced from the weld joint.

13. The formation method of claim 1, wherein at least one of
the providing of the first component comprises stamping the first component from a first preform; or
the providing of the second component comprises stamping the second component from a second preform.

14. The formation method of claim 1, wherein the first component and the second component are included in a structure for an aircraft.

\* \* \* \* \*